US010805482B2

(12) United States Patent
Nishikai et al.

(10) Patent No.: US 10,805,482 B2
(45) Date of Patent: Oct. 13, 2020

(54) REMOTE MANAGEMENT SYSTEM FOR DISTRIBUTING ACCESSES FROM IMAGE FORMING APPARATUSES, AND INFORMATION PROCESSING METHOD FOR DISTRIBUTING ACCESSES FROM IMAGE FORMING APPARATUSES

(71) Applicant: KYOCERA DOCUMENT SOLUTIONS INC., Osaka (JP)

(72) Inventors: Kazuki Nishikai, Osaka (JP); Takeshi Nakamura, Osaka (JP); Satoshi Goshima, Osaka (JP); Dukil Park, Osaka (JP); Yuichi Obayashi, Osaka (JP); Takumi Nakamura, Osaka (JP); Koki Nakajima, Osaka (JP); Yasuo Nakashima, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/418,437

(22) Filed: May 21, 2019

(65) Prior Publication Data

US 2019/0364160 A1    Nov. 28, 2019

(30) Foreign Application Priority Data

May 25, 2018 (JP) ................................. 2018-100489

(51) Int. Cl.
*H04N 1/00* (2006.01)
*H04N 1/32* (2006.01)

(52) U.S. Cl.
CPC ..... *H04N 1/00344* (2013.01); *H04N 1/00244* (2013.01); *H04N 1/32523* (2013.01); *H04N 1/32545* (2013.01); *H04N 2201/0094* (2013.01)

(58) Field of Classification Search
CPC ............ H04N 1/00244; H04N 1/00344; H04L 67/1023; G06F 2206/1508
See application file for complete search history.

(56) References Cited

U.S. PATENT DOCUMENTS

2004/0215759 A1* 10/2004 Takahashi ............. G06F 3/1229
                                                       709/223
2012/0099139 A1*  4/2012 Zhou .................... G06F 3/1285
                                                       358/1.15

(Continued)

FOREIGN PATENT DOCUMENTS

JP    1999-220563 A    8/1999
JP    2004-118689 A    4/2004

*Primary Examiner* — Nicholas Pachol
(74) *Attorney, Agent, or Firm* — Li & Cai Intellectual Property (USA) Office (57) ABSTRACT

The remote maintenance server includes a processor that operates as a connection inquiry receiving unit that receives an inquiry from the one or more image forming apparatuses, the inquiry inquiring which connection server to connect, a connection destination selecting unit that selects a connection server as a connection destination in response to the inquiry with reference to the connection management table, the connection destination being a connection server having a smaller number of connections, and a connection information reply sending unit that sends, in reply, connection information to an image forming apparatus, which has sent the inquiry, the connection information being an IP address or FQDN of the connection server selected by the connection destination selecting unit.

6 Claims, 7 Drawing Sheets

(56) References Cited

U.S. PATENT DOCUMENTS

| | | | |
|---|---|---|---|
| 2013/0286430 A1* | 10/2013 | Morris | G06F 3/126 |
| | | | 358/1.15 |
| 2015/0124290 A1* | 5/2015 | Tajima | G06Q 10/10 |
| | | | 358/1.15 |
| 2015/0281093 A1* | 10/2015 | Nishiguchi | H04L 69/40 |
| | | | 370/235 |
| 2015/0301765 A1* | 10/2015 | Nishiyama | G06F 3/1203 |
| | | | 358/1.15 |
| 2017/0054860 A1* | 2/2017 | Sakuma | H04N 1/00344 |
| 2017/0078512 A1* | 3/2017 | Mochizuki | H04N 1/00973 |
| 2017/0104849 A1* | 4/2017 | Mizuno | H04L 67/325 |
| 2017/0201635 A1* | 7/2017 | Takamoto | H04N 1/00042 |
| 2018/0332182 A1* | 11/2018 | Fukasawa | H04N 1/32771 |
| 2019/0068818 A1* | 2/2019 | Yabe | G06F 1/32 |
| 2019/0364168 A1* | 11/2019 | Nishikai | G06F 3/123 |
| 2019/0391769 A1* | 12/2019 | Nishikai | H04N 1/327 |

\* cited by examiner

FIG. 1

70a: Connection management table

| No. | Server name | Number of connections |
|---|---|---|
| 1 | Connection server 30A | 4000 |
| 2 | Connection server 30B | 3000 |
| 3 | Connection server 30C | 4000 |
| ⋮ | ⋮ | ⋮ |

70a': Connection management table

| No. | Server name | Number of connections | Software version | Type of image forming apparatus | Presence or absence of gateway agent |
|---|---|---|---|---|---|
| 1 | Connection server 30A | 4000 | V1 | Black and white | Presence |
| 2 | Connection server 30B | 3000 | V2 | Full color | Absence |
| 3 | Connection server 30C | 4000 | V3 | ... | Absence |
| ... | ... | ... | ... | ... | ... |

FIG.7

REMOTE MANAGEMENT SYSTEM FOR DISTRIBUTING ACCESSES FROM IMAGE FORMING APPARATUSES, AND INFORMATION PROCESSING METHOD FOR DISTRIBUTING ACCESSES FROM IMAGE FORMING APPARATUSES

CROSS REFERENCE TO RELATED APPLICATION

This application claims the benefit of Japanese Priority Patent Application JP 2018-100489 filed May 25, 2018, the entire contents of which are incorporated herein by reference.

BACKGROUND OF THE INVENTION

1. Field of the Invention

The present disclosure relates to a remote management system and an information processing method for remotely managing image forming apparatuses (MFP, Multifunction Peripherals) via a network.

2. Description of Related Art

There is known a system that remotely manages several hundreds to several hundreds of thousands of image forming apparatuses. Such a system has a huge traffic as a whole even if a traffic of one image forming apparatus is small. The traffic includes connection, sending and receiving commands, and sending data from the image forming apparatuses to the management system.

SUMMARY OF THE INVENTION

According to an embodiment of the present disclosure, there is provided a remote management system, comprising:
a database;
a remote maintenance server;
one or more connection servers; and
one or more image forming apparatuses,
the database, the remote maintenance server, and the one or more connection servers being connected to each other via a network,
the one or more image forming apparatuses being connected via Internet,
the database storing a connection management table, the connection management table describing a combination of a name of each of the one or more connection servers and a current number of connections from the one or more image forming apparatuses to each of the one or more connection servers,
the remote maintenance server including a processor that operates as
a connection inquiry receiving unit that receives an inquiry from the one or more image forming apparatuses, the inquiry inquiring which connection server to connect,
a connection destination selecting unit that selects a connection server as a connection destination in response to the inquiry with reference to the connection management table, the connection destination being a connection server having a smaller number of connections, and
a connection information reply sending unit that sends, in reply, connection information to an image forming apparatus, which has sent the inquiry, the connection information being an IP address or FQDN of the connection server selected by the connection destination selecting unit,
each of the one or more image forming apparatuses including a processor that operates as
a connection inquiry unit that sends the inquiry to the remote maintenance server, the inquiry inquiring which connection server to connect, and obtains the connection information, and
a connection establishing unit that establishes connection to the connection server specified on a basis of the connection information obtained from the remote maintenance server.

According to an embodiment of the present disclosure, there is provided an information processing method of a remote management system including a database, a remote maintenance server, one or more connection servers, and one or more image forming apparatuses, the database, the remote maintenance server, and the one or more connection servers being connected to each other via a network, the one or more image forming apparatuses being connected via Internet, the information processing method comprising:
by the database, storing a connection management table, the connection management table describing a combination of a name of each of the one or more connection servers and a current number of connections from the one or more image forming apparatuses to each of the one or more connection servers;
by a connection inquiry unit of each of the one or more image forming apparatuses, sending an inquiry to the remote maintenance server, the inquiry inquiring which connection server to connect;
by a connection inquiry receiving unit of the remote maintenance server, receiving the inquiry from the one or more image forming apparatuses, the inquiry inquiring which connection server to connect;
by a connection destination selecting unit of the remote maintenance server, selecting a connection server as a connection destination in response to the inquiry with reference to the connection management table, the connection destination being a connection server having a smaller number of connections;
by a connection information reply sending unit of the remote maintenance server, sending in reply, connection information to an image forming apparatus, which has sent the inquiry, the connection information being an IP address or FQDN of the connection server selected by the connection destination selecting unit;
by a connection inquiry unit of each of the one or more image forming apparatuses, obtaining the connection information; and
by a connection establishing unit of each of the one or more image forming apparatuses, establishing connection to the connection server specified on a basis of the connection information obtained from the remote maintenance server.

These and other objects, features and advantages of the present disclosure will become more apparent in light of the following detailed description of best mode embodiments thereof, as illustrated in the accompanying drawings.

BRIEF DESCRIPTION OF THE DRAWINGS

FIG. 2 shows a specific example of the connection management table 70a;

FIG. 7 shows a modification example 2 of the connection management table 70a.

DETAILED DESCRIPTION OF THE PREFERRED EMBODIMENTS

Hereinafter, an embodiment of the present disclosure will be described with reference to the drawings.

Entire Configuration

Figure 1:
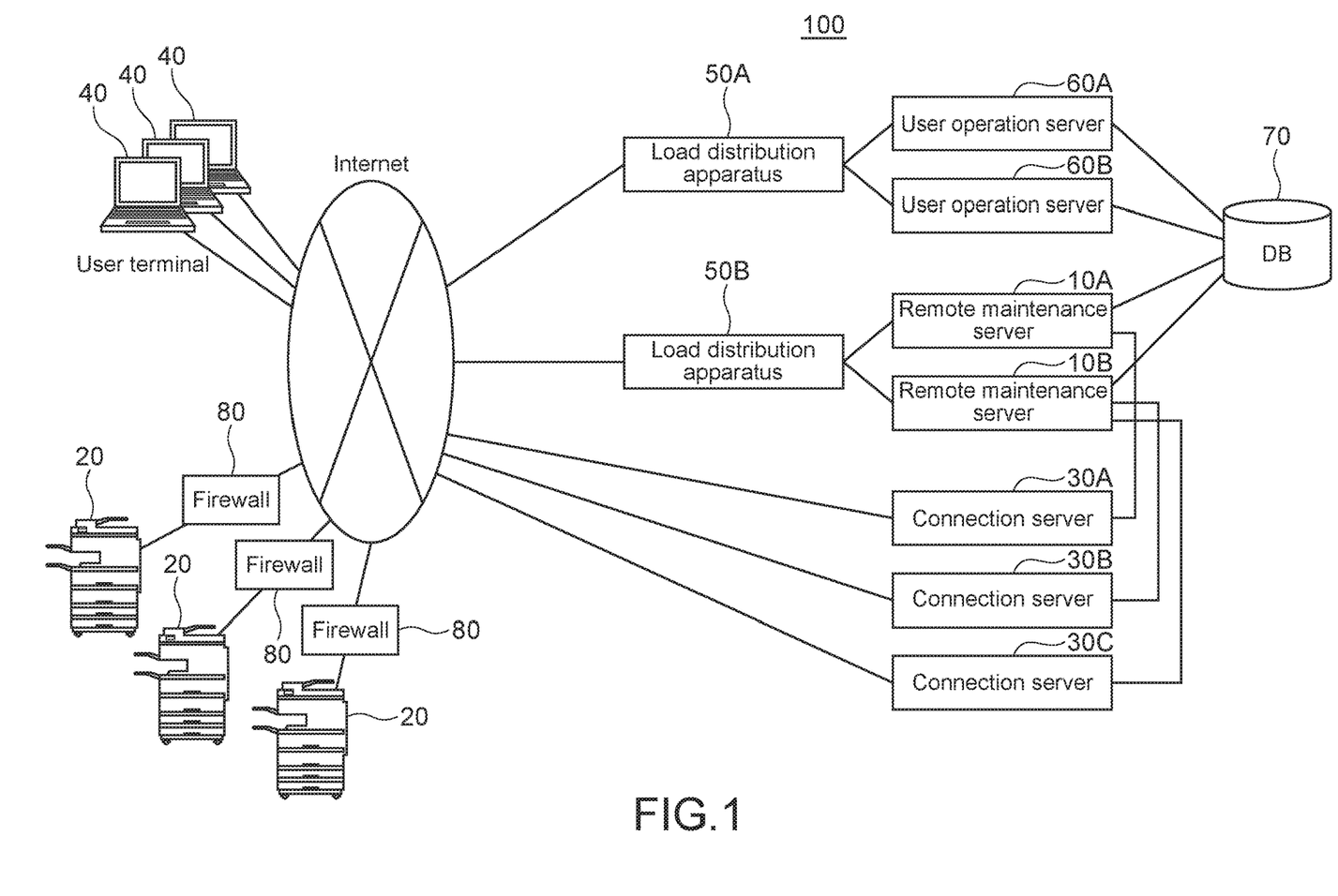
FIG. 1 shows an entire configuration of the remote management system 100 according to an embodiment of the present disclosure.

Firstly, an entire configuration of the remote management system 100 according to an embodiment of the present disclosure will be described. FIG. 1 shows an entire configuration of the remote management system 100 according to an embodiment of the present disclosure.

The remote management system 100 includes the load distribution apparatuses 50, the user operation servers 60, the remote maintenance servers 10, the DB (database) 70, the connection servers 30, and the one or more image forming apparatuses 20, which are connected to each other via a network.

End points from the Internet includes the load distribution apparatus 50A, the load distribution apparatus 50B, the connection server 30A, the connection server 30B, and the connection server 30C. The load distribution apparatus 50A distributes accesses from the user terminals 40 to the user operation servers 60A and 60B. The load distribution apparatus 50B distributes accesses from the image forming apparatuses 20 to the remote maintenance servers 10A and 10B.

The load distribution apparatus 50A distributes accesses from the user terminals 40 to the user operation servers 60A and 60B.

The user operation servers 60 (the user operation servers 60A and 60B are collectively referred to as the user operation server(s) 60, hereinafter) receive instructions from the user terminals 40 input by users.

The load distribution apparatus 50B distributes accesses from the image forming apparatuses 20 to the remote maintenance servers 10A and 10B.

The remote maintenance server 10 remotely maintains the image forming apparatuses 20 that the remote maintenance server 10 manages. For example, the remote maintenance server 10 collects daily work information (toner consumption, number of print, etc.), stores the daily work information in the DB 70, updates firmware of the image forming apparatuses 20.

The DB 70 stores the daily work information as described above, and stores the connection management table 70a (described later).

The connection server 30 is a server that executes management connection to the image forming apparatuses 20 in order to send management commands to the image forming apparatuses 20 managed in the remote management system 100. The management connection is continued until the image forming apparatus 20 is powered off.

The image forming apparatus 20 connected to the network firstly connects to the remote maintenance server 10 via the load distribution apparatus 50B, and obtains a response. The response specifies the connection server 30 to which management connection is to be established. After that, the image forming apparatus 20 shuts down the connection to the remote maintenance server 10, connects to the specified connection server 30, and establishes the management connection.

An entire configuration of the remote management system 100 has been described above. Note that, for example, FIG. 1 shows the three connection servers 30. This is merely an example. Actually, the number of the connection servers 30 is not limited.

Connection Management Table

Figure 2:
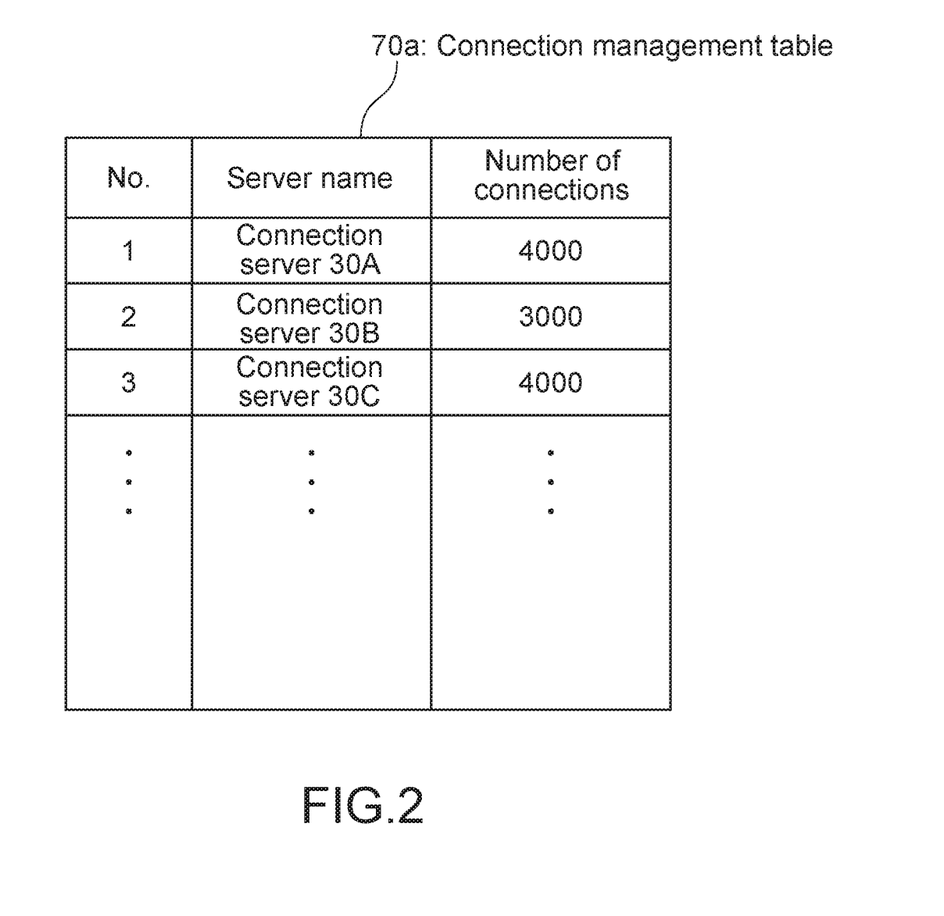

Next, the connection management table 70a will be described. FIG. 2 shows a specific example of the connection management table 70a.

The connection management table 70a stores pairs of a server name of the connection server 30 and the number of connections of the image forming apparatuses 20, which establish connections currently.

For example, the connection server 30A of the item number 1 has the number of connections=4000. It means that the connection server 30A establishes management connections to the 4000 image forming apparatuses 20 currently.

When the remote maintenance server 10 receives an inquiry about the connection server 30 to connect from the image forming apparatus 20, the remote maintenance server 10 sends a response with reference to the connection management table 70a. The response indicates that the image forming apparatus 20 should connect to the connection server 30 having a smaller number of connections.

In the example of FIG. 2, the image forming apparatus 20 should connect to the connection server 30B having a smaller number of connections. So the remote maintenance server 10 sends a response indicating the connection information of the connection server 30B (IP (Internet Protocol) address or FQDN (Fully Qualified Domain Name) of the connection server 30B) to the image forming apparatus 20 which has sent the inquiry.

As described above, a management connection is established with the connection server 30 having a smaller number of connections. So, even if the number of image forming apparatuses to be managed is increased, when a connection to the remote management system is found, the connection is distributed to an appropriate apparatus. As a result, it is possible to realize the stable remote management.

The connection management table 70a has been described above.

Configuration of Remote Maintenance Server

Figure 3:
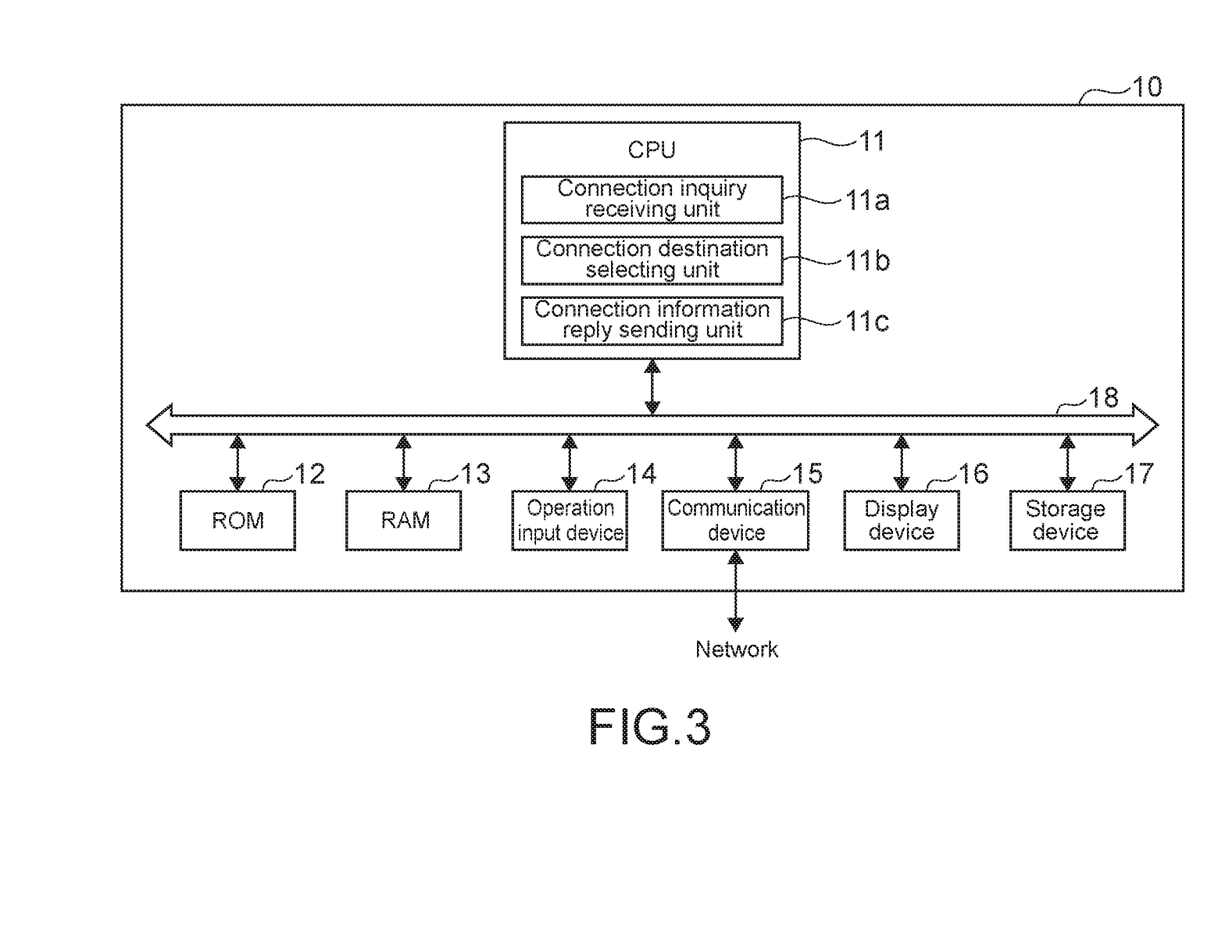
FIG. 3 shows a block configuration of the remote maintenance server 10, where the remote maintenance server 10 is a general-purpose computer.

Next, a configuration of the remote maintenance server 10 will be described. The remote maintenance server 10 may include dedicated hardware or software or a general-purpose computer. FIG. 3 shows a block configuration of the remote maintenance server 10, where the remote maintenance server 10 is a general-purpose computer.

As shown in FIG. 3, the remote maintenance server 10 includes a CPU (Central Processing Unit) 11, a ROM (Read Only Memory) 12, a RAM (Random Access Memory) 13, an operation input device 14, a communication device 15, a display device 16, a storage device 17, and these blocks are connected to each other via a bus 18.

The ROM 12 stores a plurality of programs such as firmware for executing various types of process, and data. The RAM 13 is used as a work area of the CPU 11 and temporarily stores an OS (Operating System), various applications being executed, and various types of data being processed.

The storage device 17 is, for example, an HDD (Hard Disk Drive), a flash memory, or other nonvolatile memories. The storage device 17 stores the OS, various applications, and various types of data.

The communication device 15 is connected to a network for sending/receiving information to/from apparatuses.

Of the plurality of programs stored in the ROM 12 or the storage device 17, the CPU 11 loads a program in the RAM 13 in response to a command input via the operation input device 14, and appropriately controls the display device 16 and the storage device 17 according to the loaded program.

The operation input device 14 is, for example, a pointing device such as a mouse, a keyboard, a touch panel, or other operation devices.

The display device 16 is, for example, a liquid crystal display, an EL (Electro-Luminescence) display, or a plasma display.

Next, functional blocks will be described. When the CPU 11 of the management server 10 executes a program, the CPU 11 operates as the functional blocks described below.

The functional blocks that the CPU 11 of the remote maintenance server 10 realizes are the connection inquiry receiving unit 11a, the connection destination selecting unit 11b, and the connection information reply sending unit 11c.

The connection inquiry receiving unit 11a receives an inquiry from the image forming apparatus 20, the inquiry inquiring which connection server 30 to connect. The image forming apparatus 20 is connected to the network, and tries to establish a management connection to the remote management system 100.

The connection destination selecting unit 11b selects a connection server 30 as a connection destination in response to the inquiry with reference to the connection management table 70a, the connection destination being a connection server 30 having a smaller number of connections, the inquiry inquiring which connection server 30 to connect.

The connection information reply sending unit 11c sends, in reply, connection information to the image forming apparatus 20, which has sent the inquiry, the connection information being connection information of the connection server 30 selected by the connection destination selecting unit 11b.

The configuration of the remote maintenance server 10 has been described above.

Configuration of Image Forming Apparatus

Figure 4:
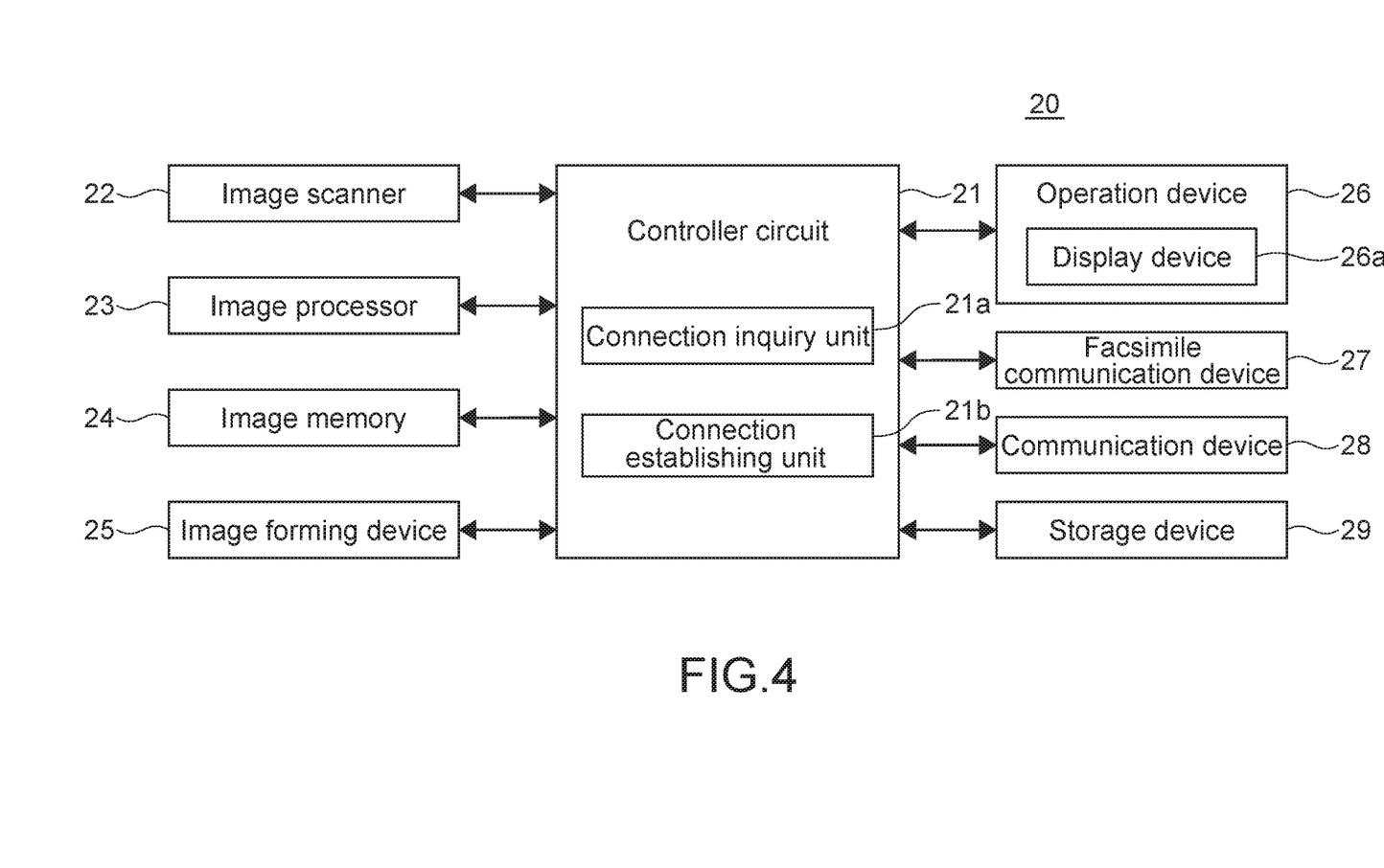
FIG. 4 schematically shows a configuration of the image forming apparatus 20.

Next, a configuration of the image forming apparatus 20 will be described. FIG. 4 schematically shows a configuration of the image forming apparatus 20.

The image forming apparatus 20 includes a controller circuit 21. The controller circuit 21 includes a CPU, a RAM, a ROM, dedicated hardware circuits, and the like and performs overall operational control of the image forming apparatus 20.

The controller circuit 21 is connected to an image scanner 22, an image processor 23, an image memory 24, an image forming device 25, an operation device 26, a display device 26a, a facsimile communication device 27, a communication device 28, a storage device 29, and the like. The controller circuit 21 performs operational control of the respective devices connected thereto and sends/receives signals and data to/from those devices.

According to job execution instructions input by a user via the operation device 26 or a personal computer (PC) connected to the network, the controller circuit 21 controls drive and process of mechanisms requisite for executing operational control of functions such as a scanner function, a printing function, a copy function, and a facsimile sending/receiving function.

Further, the controller circuit 21 includes the connection inquiry unit 21a and the connection establishing unit 21b. The CPU of the image forming apparatus 20 loads a program, which is stored in a ROM or the like, in a RAM and executes the program. When the CPU of the image forming apparatus 20 executes the program, the CPU operates as the connection inquiry unit 21a and the connection establishing unit 21b.

The connection inquiry unit 21a sends the inquiry to the remote maintenance server 10, the inquiry inquiring which connection server 30 to connect, and obtains the connection information, when the image forming apparatus 20 establishes a management connection to the remote management system 100.

The connection establishing unit 21b establishes a management connection to the connection server 30 specified on a basis of the connection information obtained from the remote maintenance server 10.

The image scanner 22 reads an image from a script.

The image processor 23 carries out an image process as necessary on image data of an image read by the image scanner 22. For example, the image processor 23 corrects shading of an image read by the image scanner 22 and carries out other image process to improve the quality of the image to be formed.

The image memory 24 includes an area that temporarily stores data of a script image read by the image scanner 22 or data to be printed by the image forming device 25.

The image forming device 25 forms an image of image data and the like read by the image scanner 22.

The operation device 26 includes a touch panel device and an operation key device that accept user's instructions on various operations and processes executable by the image forming apparatus 20. The touch panel device includes the display device 26a such as an LCD (Liquid Crystal Display) equipped with a touch panel.

The facsimile communication device 27 includes an encoding/decoding device, a modulation/demodulation device, and an NCU (Network Control Unit) (all of which are not shown) and transmits facsimiles using a public telephone network.

The communication device 28 is constituted of a communication module such as a LAN board and sends/receives various types of data to/from apparatuses (the remote maintenance server 10, the connection server 30, etc.) connected to the network via a LAN connected to the communication device 28, and the like.

The storage device 29 stores a script image read by the image scanner 22 and the like. The storage device 29 is a large-volume storage device such as an HDD.

A configuration of the image forming apparatus 20 has been described above.

Processing Flow

Figure 5:
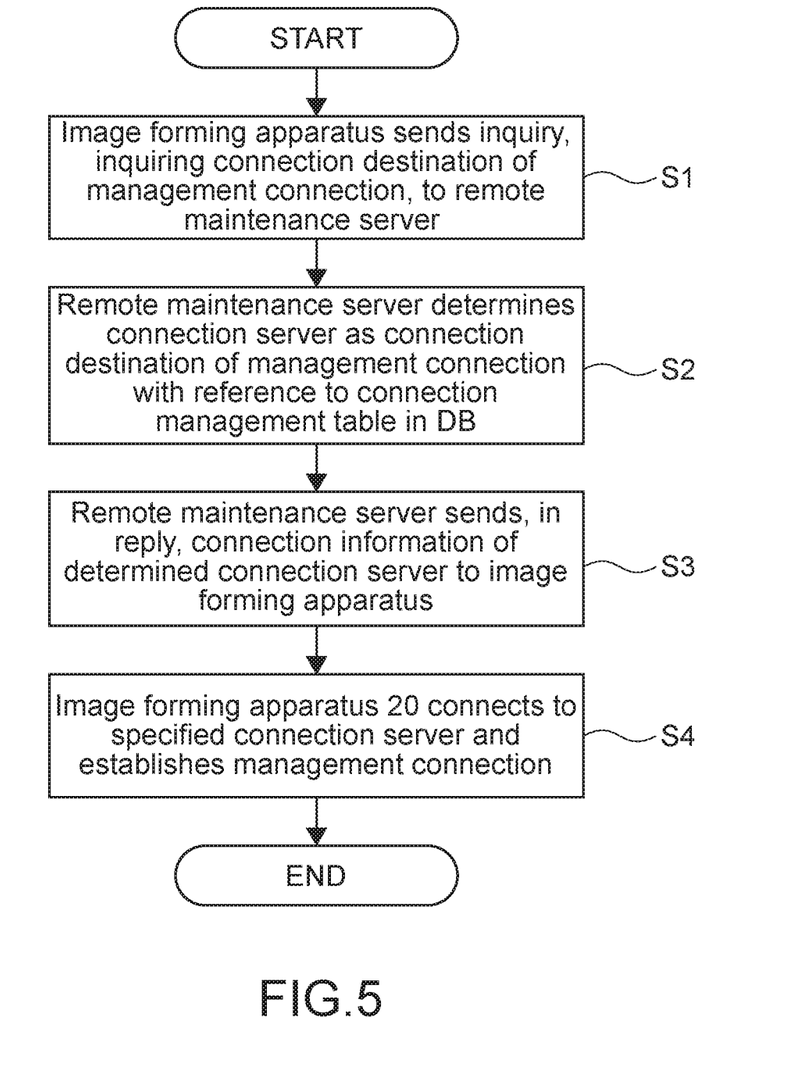
FIG. 5 shows a processing flow of the remote management system 100 when establishing a management connection.

Next, a processing flow of the remote management system 100 when establishing a management connection will be described. FIG. 5 shows a processing flow of the remote management system 100 when establishing a management connection.

Firstly, the connection inquiry unit 21a of the image forming apparatus 20, which tries to establish a management connection, sends an inquiry to the connection inquiry receiving unit 11a of the remote maintenance server 10. The inquiry inquires a connection destination of the management connection (Step S1).

Next, the connection destination selecting unit 11b of the remote maintenance server 10 determines a connection server 30 as a connection destination of the management connection with reference to the connection management table 70a in the DB 70 (Step S2).

Next, the connection information reply sending unit 11c of the remote maintenance server 10 sends, in reply, the connection information of the determined connection server 30 to the image forming apparatus 20 (Step S3).

Next, the connection establishing unit 21b of the image forming apparatus 20 connects to the specified connection server 30, and establishes a management connection (Step S4).

A processing flow of the remote management system 100 when establishing a management connection has been described above.

According to the aforementioned configuration, it is possible to assign management connections, which is well within the capacity of each connection server 30, to the image forming apparatuses 20 on the basis of the maximum connection volume of the connection servers 30 and the number of connection requests from the image forming apparatuses 20.

Modification Example 1

In the aforementioned embodiment, the image forming apparatus 20 at a user site can recognize the multiple connection servers 30 as end points. As a result, the firewall 80 at the user site explicitly registers the multiple end points in a white list, which is burdensome.

Figure 6:
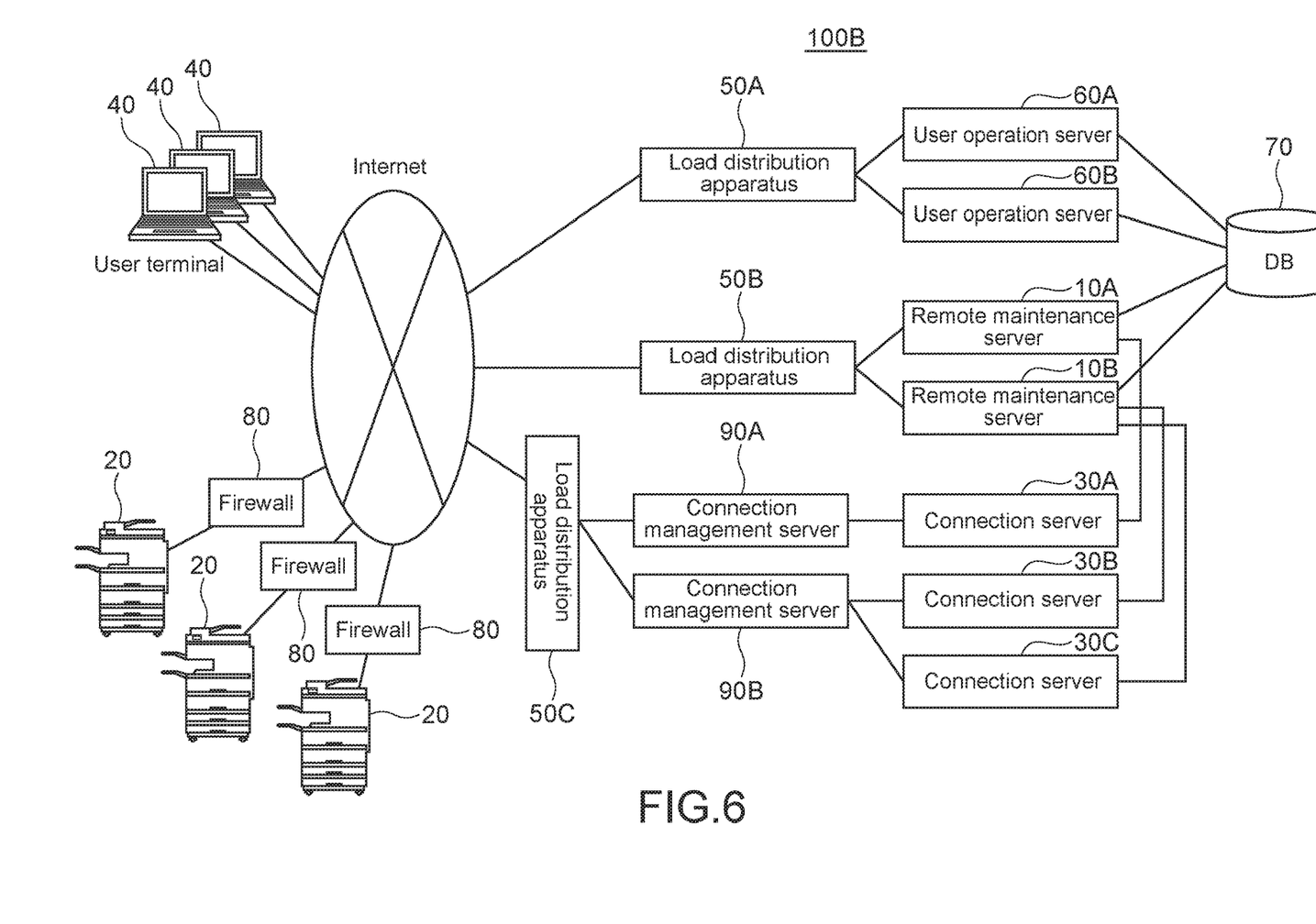
FIG. 6 shows a modification example 1 of the remote management system 100.

In view of the aforementioned circumstances, according to the present modification example 1, as shown in FIG. 6, the image forming apparatus 20 recognizes one end point to establish a management connection. In the upstream of a group of the connection servers 30, one or more connection management servers 90 that manage the connection servers 30 and the load distribution apparatus 50C (i.e., one end point) are provided.

The end points for establishing management connections are concentrated on one point (i.e., the load distribution apparatus 50C). As a result, the number of end points, which should be registered in the white list of the firewall 80 at the user site is decreased, which reduces the burden of registration.

As a result, it is only necessary to set a simple configuration of the firewall 80 at the user site, at which the image forming apparatus 20 is provided, for operations. It is possible to minimize change of the configuration setting of the firewall 80 even if resources of the remote management system 100B is increased in the future.

The modification example 1 has been described above.

Modification Example 2

Figure 7:
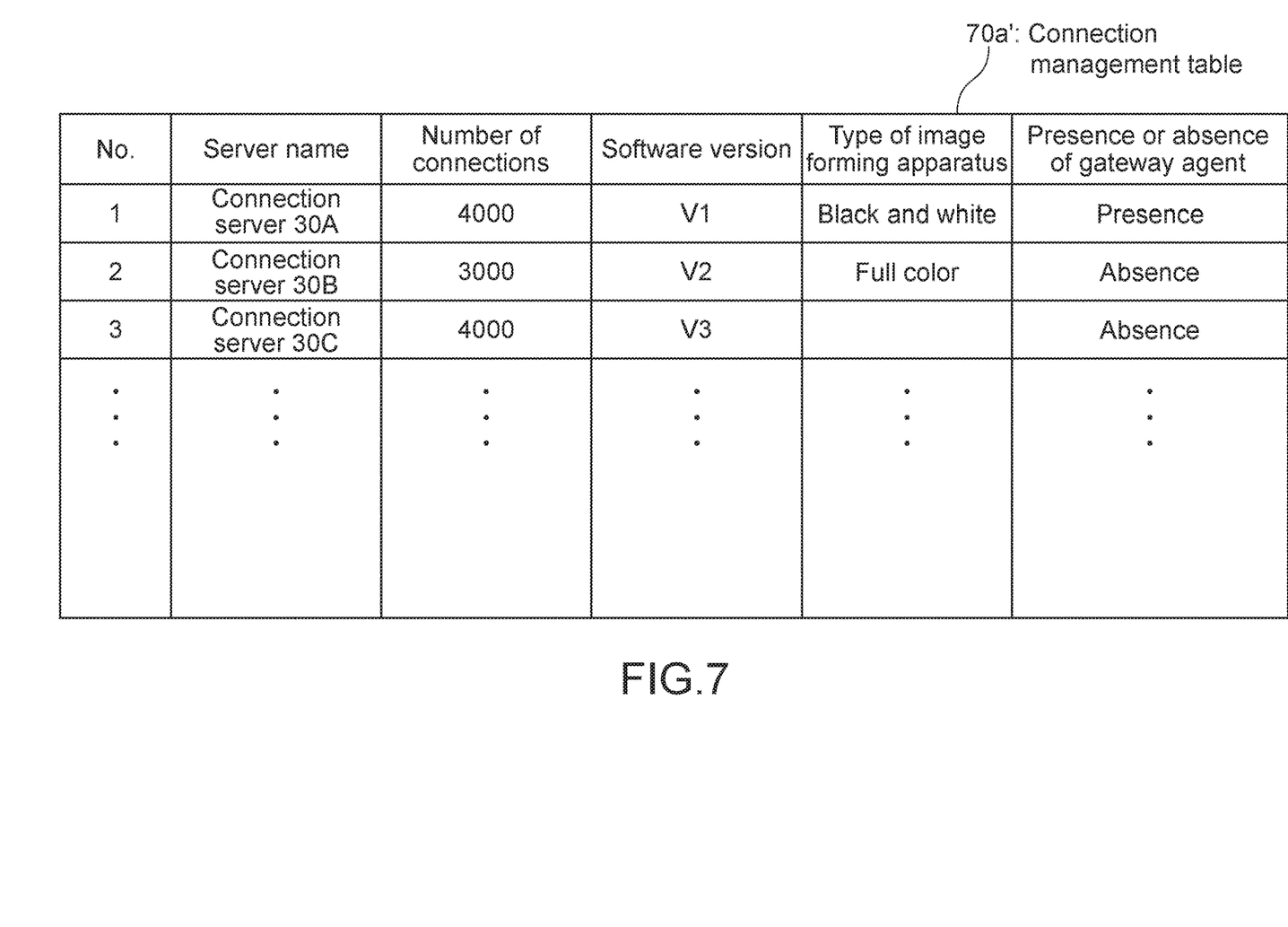

In the aforementioned embodiment, the connection management table 70a stores combinations of the server name and the number of connections. In addition, as shown in FIG. 7, the connection management table 70a' may additionally store items including the software version of the connection server 30, the type of the image forming apparatus 20, presence or absence of a gateway agent, and the like.

A gateway agent is provided between an image forming apparatus and the remote management system 100 in order to connect to the remote management system 100 and an image forming apparatus, which is not capable of directly communicating with the remote management system 100 such as an image forming apparatus manufactured by a third vender.

By using the connection management table 70a', it is possible to determine the connection server 30 to connect for each type of the image forming apparatus 20 or depending on presence or absence of a gateway agent.

Further, if software, whose version supports a new function, is installed in the connection server 30, it is possible to test whether an appropriate connection of the image forming apparatus 20 can be made by using the traffic of the real environment without affecting the availability of the entire remote management system 100.

The modification example 2 has been described above.

It should be understood by those skilled in the art that various modifications, combinations, sub-combinations and alterations may occur depending on design requirements and other factors insofar as they are within the scope of the appended claims or the equivalents thereof.

What is claimed is:

1. A remote management system, comprising:
   a database;
   remote maintenance servers;
   one or more connection servers;
   one or more image forming apparatuses; and
   a first load distribution apparatus that distributes accesses from the one or more image forming apparatuses to the remote maintenance servers,
   the database, the remote maintenance servers, and the one or more connection servers being connected to each other via a network,
   the one or more image forming apparatuses being connected via Internet,
   the first load distribution apparatus being connected to the remote maintenance servers and being connected to the one or more image forming apparatuses via the Internet,
   the database storing a connection management table, the connection management table describing a combination of a name of each of the one or more connection servers and a current number of connections, the current number of connections indicating a number of the one or more image forming apparatuses to which each of the one or more connection servers establishes connections currently,
   each of the remote maintenance servers including a processor that operates as
      a connection inquiry receiving unit that receives an inquiry from the one or more image forming apparatuses, the inquiry inquiring which connection server to connect,
      a connection destination selecting unit that selects a connection server as a connection destination in response to the inquiry with reference to the connection management table, the connection destination being a connection server having a smaller value of the current number of connections, and a connection information reply sending unit that sends, in reply, connection information to an image forming apparatus, which has sent the inquiry, the connection information being an IP address or FQDN of the connection server selected by the connection destination selecting unit, each of the one or more image forming apparatuses including a processor that operates as a connection inquiry unit that connects to one remote maintenance server of the remote maintenance servers via the first load distribution apparatus, sends the inquiry to the one remote maintenance server, the inquiry inquiring which connection server to connect, obtains the connection information, and then shuts down the connection to the one remote maintenance server, and a connection establishing unit that establishes connection to the connection server specified on a basis of the connection information obtained from the one remote maintenance server after the connection to the one remote maintenance server is shut down.

2. The remote management system according to claim 1, further comprising:

a second load distribution apparatus being one end point; and one or more connection management servers that manages the one or more connection servers, the one or more connection management servers being connected from the second load distribution apparatus, the second load distribution apparatus and the one or more connection management servers being connected between the one or more connection servers and the Internet, the second load distribution apparatus being connected between the Internet and the one or more connection management servers.

3. The remote management system according to claim 1, wherein the connection management table further describes, in addition to the combination of the name of each of the one or more connection servers and the current number of connections, a version of software of each of the one or more connection servers.

4. The remote management system according to claim 1, wherein the connection management table further describes, in addition to the combination of the name of each of the one or more connection servers and the current number of connections, a type of each of the one or more image forming apparatuses connected.

5. The remote management system according to claim 1, wherein the connection management table further describes, in addition to the combination of the name of each of the one or more connection servers and the current number of connections, presence or absence of a gateway agent.

6. An information processing method of a remote management system including a database, remote maintenance servers, one or more connection servers, one or more image forming apparatuses, and a first load distribution apparatus that distributes accesses from the one or more image forming apparatuses to the remote maintenance servers, the database, the remote maintenance servers, and the one or more connection servers being connected to each other via a network, the one or more image forming apparatuses being connected via Internet, the first load distribution apparatus being connected to the remote maintenance servers and being connected to the one or more image forming apparatuses via the Internet, the information processing method comprising:

by the database, storing a connection management table, the connection management table describing a combination of a name of each of the one or more connection servers and a current number of connections, the current number of connections indicating a number of the one or more image forming apparatuses to which each of the one or more connection servers establishes connections currently;

by a connection inquiry unit of each of the one or more image forming apparatuses, connecting to one remote maintenance server of the remote maintenance servers via the first load distribution apparatus, and sending an inquiry to the one remote maintenance server, the inquiry inquiring which connection server to connect;

by a connection inquiry receiving unit of the one remote maintenance server, receiving the inquiry from the one or more image forming apparatuses, the inquiry inquiring which connection server to connect;

by a connection destination selecting unit of the one remote maintenance server, selecting a connection server as a connection destination in response to the inquiry with reference to the connection management table, the connection destination being a connection server having a smaller value of the current number of connections;

by a connection information reply sending unit of the one remote maintenance server, sending in reply, connection information to an image forming apparatus, which has sent the inquiry, the connection information being an IP address or FQDN of the connection server selected by the connection destination selecting unit;

by a connection inquiry unit of each of the one or more image forming apparatuses, obtaining the connection information, and then shutting down the connection to the one remote maintenance server; and by a connection establishing unit of each of the one or more image forming apparatuses, establishing connection to the connection server specified on a basis of the connection information obtained from the one remote maintenance server after the connection to the one remote maintenance server is shut down.

\* \* \* \* \*